United States Patent Office 3,448,264
Patented June 3, 1969

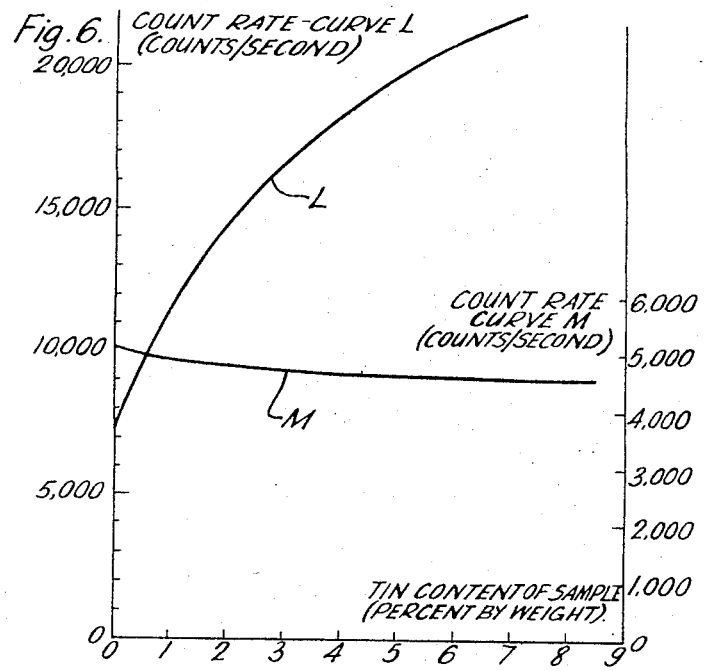
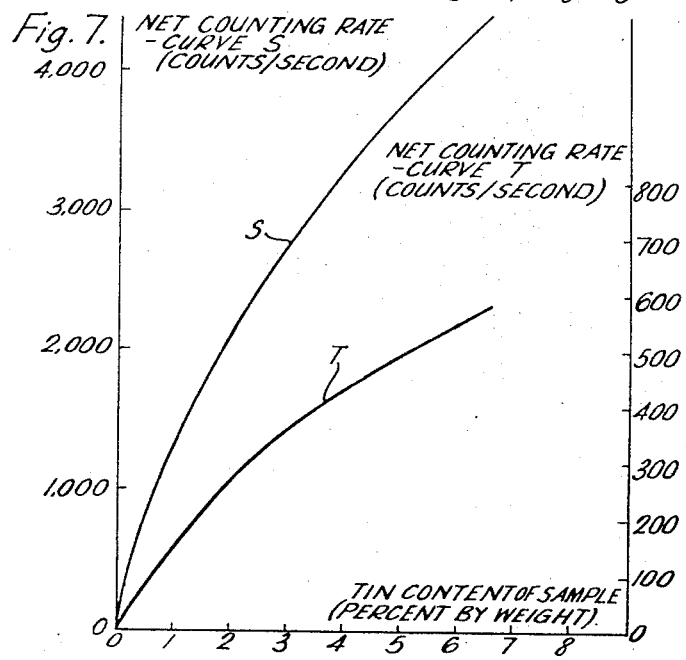

3,448,264
X-RAY SOURCE AND MEASURING MEANS FOR BACKSCATTER ANALYSIS OF SAMPLES
John Rathbone Rhodes, Wallingford, England, assignor to United Kingdom Atomic Energy Authority, London, England
Filed Sept. 8, 1965, Ser. No. 485,773
Int. Cl. G01n 23/20; H01j 37/20
U.S. Cl. 250—51.5                            13 Claims

ABSTRACT OF THE DISCLOSURE

Apparatus for X-ray analysis using backscatter geometry comprises a radioisotope source and a generally concave target for X-rays from such source to generate secondary X-rays. Radiation measuring means and shaped filters surround the target and shields are provided to prevent primary and secondary radiation reaching the radiation measuring means.

The present invention relates to apparatus for analysis making use of X-rays generated with the assistance of a radioactive isotope.

It will be understood that for many purposes X-rays and γ-rays may be regarded as interchangeable, but it will also be known that when highly energetic radiation, for example β-rays or γ-rays from a radioactive isotope source, interacts with matter it can give rise to a secondary radiation which, for the purpose of this invention, will be termed "X-rays." I should be noted that X-rays are conventionally generated by accelerating electrons in an evacuated tube and causing them to impinge upon a target to interact with it; this arrangement used in conventional X-ray machines is not within the scope of the present invention. Radioactive isotope sources are relatively small and cheap and are therefore generally to be preferred as compared with the conventional X-ray machines, but they suffer from the disadvantage that the intensity level is very considerably lower than that obtainable from an X-ray machine. Consequently, if the maximum use of an isotope source is to be made, it is extremely important that the geometry be as efficient as possible, that is to say, unwanted losses must be reduced to the minimum.

It will also be known that energetic radiation can interact with matter in three different ways, namely, by absorption, back-scattering (or reflection) and by exciting fluorescence and each of these three different ways of interacting may form the basis of analysis. It will also be understood that each element in the sample to be analysed will interact with the radiation in its own characteristic manner which, broadly speaking, is dependent upon atomic number. Clearly, the chief problem is to find a method and apparatus which has wide applicability for analysis and it follows that the device must be sensitive and that interelement effects must be reduced to the minimum.

It might be thought that since there are a very large number of radioactive isotopes now available, it would be easy to obtain a source having the precise energy that is required for any particular purpose but in practice this is not so, for the sources which are available for normal use are in point of fact few, as many isotopes are unsuitable for use as sources by reason of low specific activity, short half-life, complex decay schemes and many other reasons. In practice it will be found that the sources can be divided into X or γ-ray sources such as, for example, americium-241, cobalt-60, cadmium-109, iron-55, some of which give a relatively broad spectrum of energies, and bremsstrahlung sources which in general include a source of highly energetic β particles mixed with another material so as to give a substantially continuous X-ray spectrum which may or may not have a peak at one or more levels of energy. Typical bremsstrahlung sources are tritium/zirconium, promethium-147/aluminium, strontium-90/aluminium.

It can be deduced that for accuracy in analysis it is most convenient to use the fluorescent technique as, in theory, this relies upon excitation of the characteristic X-rays of the wanted element to the nominal exclusion of the characteristic X-rays of all other elements so that analysis of the specimen is, in theory, a simple matter. However, in practice, it is extremely difficult to arrange for the excitation of the wanted element to be unaccompanied by excitation of fluorescent X-rays from other elements and it is not at all easy to arrange that reflected or transmitted incident X-rays and the fluorescent X-rays from the unwanted elements should be prevented from being counted simultaneously with the wanted X-rays. Using a conventional X-ray machine, an X-ray spectrometer can be used which will do this without difficulty but the geometrical and other losses in such an instrument are of the order of $10^7$ and the specific activities of isotope sources are too low to permit this order of loss and still result in a count rate which is acceptable. Consequently other expedients must be adopted for isolating the wanted X-rays from the unwanted X-rays.

It can also be calculated that using X-ray fluorescence techniques it is most efficient to use back scattering geometry rather than transmission geometry although both are, in theory, possible. Hence, calculations show that for maximum efficiency in detection it is necessary to use a fluorescence technique with back scattering geometry. In this connection it should be mentioned that this geometry simplifies the sample preparation as it is only necessary to use a sample of thickness greater than "saturation" thickness and of substantially uniform particle size, whereas with transmission geometry it is necessary to use a sample of rigidly controlled constant mass per unit area and the optimum thickness of such a sample may be very critical indeed.

It will also be known that if the mass absorption characteristics of elements are plotted against energy on the conventional log-linear scale the absorption coefficient of each element will decrease until it reaches a minimum value at which it will increase over an extremely narrow band of energies to a maximum value from which it falls away gradually. It will be known, also, that this sharp change in absorption coefficient, known as the "K absorption edge" differs in energy from element to element. At energies below the K absorption edge of the sample it is not possible to excite fluorescent K X-rays and maximum efficiency of excitation of the K X-rays of the sample is achieved by the use of an energy very slightly in excess of the absorption edge energy. Hence we may deduce that for maximum efficiency in analysis, monochromatic X-rays ought preferably to be used, the energy of such X-rays being selected in accordance with the element that is to be analysed. A further advantage is that because this is the lowest energy that can be used for exciting the desired fluorescent radiation the unwanted back scattered X-rays have their minimum intensity.

This abrupt change in the absorption coefficients of elements also allows filters to be used and the techniques for using filters are, in general, two. Thus, a single "absorption edge" filter may be used and may be selected so that its absorption is relatively low with regard to the X-ray energy of interest whilst it is relatively high with regard to X-ray energies that are not wanted, but it will be understood that in general and for maximum effect the wanted X-ray energy must be lower than the unwanted X-ray energy. It is possible to overcome this defect of absorption edge filters by using a pair of such filters in an arrangement known as "balanced" or "differential filters." With this arrangement two filters of closely adjacent atomic number are used and have their thicknesses adjusted so that at energies below the lower absorption edge and above the higher absorption edge the absorption characteristics of the two filters are substantially identical. By making counts using the two filters separately and subtracting the result, the effective total count will be that corresponding only to X-rays having an energy between the two absorption edges.

Having now described in some detail the available techniques for X-ray analysis and having also described some of the difficulties of some of these available techniques it is possible to describe the present invention. The object of the present invention is therefore clearly to provide an improved X-ray analysis apparatus.

According to the present invention there is provided apparatus for X-ray analysis using back-scatter geometry, such apparatus comprising a radio isotope source of X-rays in a holder positioned so that primary radiation from the source strikes a generally concave target thereby to obtain secondary X-rays from said target, a radiation measuring means having an external radiation measuring surface, such surface extending at least partially round the perimeter of the said target, means to accommodate a shaped filter adjacent to the said external radiation measuring surface and means to prevent the primary and secondary radiation entering the radiation measuring means directly.

The term "X-rays" as used herein includes radiation falling in an energy range of from the order of one kev. to several mev. It will be appreciated that some of the radiation in this energy range is sometimes considered to be gamma radiation. The radio-isotope source of X-rays thus includes sources which are more usually considered to be gamma-ray sources, as well as the normal X-ray isotope sources and bremsstrahlung sources. Beta ray sources are not within the scope of the invention since the X-rays excited in the target would contain an excessive amount of non-monochromatic radiation. It is pointed out that it has previously been proposed (Reiffel, Nucleonics, March 1955) to generate substantially monochromatic X-rays by the combination of a radio-isotope source and a target.

The target, which may comprise more than one component, is chosen to provide secondary X-rays having energies most suitable, for the desired back-scattering by, or excitation of fluorescence in, the sample, and the source is necessarily chosen having the nature of the target in mind.

It should however be appreciated that the most efficient arrangement is not necessarily that using a target element giving maximum back-scatter or fluorescence from the sample and, as will be discussed in more detail hereafter, the optimum target element will usually be intermediate between that which is most efficiently excited by the source and that which gives maximum efficiency in exciting a response from the sample.

The target is shaped to ensure maximum excitation of X-rays in the target and selective direction of these excited X-rays, possibly together with primary radiation back-scattered from the source, onto the sample in such a way that X-rays passing from the sample in a back-scattered direction will reach the radiation measuring surface of the radiation measuring means. The preferred target shape is frusto-conical, but other possible shapes include part spherical, elliptical and parabolic surfaces and also various forms of pyramid.

The radiation measuring means may be any of the known types, for example, scintillation counter, proportional counter, Geiger counter, ionisation chamber, or solid state detector, and in the case of a scintillation counter or solid state detector the surface thereof forms the radiation measuring surface. Using a scintilaltion counter as the radiation measuring means, the scintillator forms the measuring surface and at least partially surrounds the target, a photomultiplier is located generally below the base of the target, and a light guide is provided to convey light from the scintillator to the photomultiplier. With a counter of the gas filled type however, the counter window is the radiation measuring surface since, although the radiation is actually measured within the counter, it is only the radiation striking the window which is measured. In addition to the more conventional radiation measuring means it may, in some instances, be desired to use a radiation measuring means which is adapted to be more sensitive to radiation of one energy, usually a low energy, than to radiation of a different, usually higher, energy, whereby compensation for the effect of an interfering element is obtained. It should therefore be appreciated that the term "radiation measuring means" includes such specialised apparatus. If a frusto-conical target is used, the radiation measuring surface would form at least part of an annulus round the open end of the target.

In effecting X-ray analysis by a back-scatter or fluorescent technique, it is usual to measure the intensity of X-rays of a particular energy. To do this it is usually necessary to use a pair of differential filters to isolate X-rays of the desired wave-length. One of the pair of filters is effectively opaque to the desired X-rays, whilst the other filter is transparent to the desired X-rays. In using such filters each in turn is placed above the radiation measuring surface and the difference between the two readings is a measure of the intensity of the wanted X-rays. If two radiation measuring surfaces are provided, either as part of one or two radiation detecting means, each such surface may have associated with it one of the differential filters, and thus a continuous reading is obtained from the radiation measuring means and this reading is proportional to the intensity of the desired X-rays.

Hence, the target may have several radiation measuring surface around it, each such surface belonging to a separate radiation measuring means and each having associated with it a suitable filter whereby the intensity of several different X-ray energies may be measured simultaneously using suitable subtraction circuits. Usually however it is not necessary to use more than two radiation measuring means with their respective different filters. When using more than one radiation measuring means, different types of measuring means could be used but in general they would all be of the same type. However, in some cases it is necessary to use only one radiation measuring means and in such a case the measuring means could possess an annular radiation measuring surface and, optionally, an annular filter, round the open end of the target, and this arrangement could be used, for example, for the determination of the ash content of a coal sample, using the technique described in my copending United States application Ser. No. 485,708, filed concurrently herewith. If the apparatus of the present invention is used for analysis in accordance with the method of our said copending applications, it is necessary that the target should be selected to give secondary X-rays of at least two distinct energy components, one of said components being an analytical component for the determination of the wanted element, the remaining components being compensating components to excite fluorescence in any elements present in the sample which interfere by virtue of the matrix absorption effect, the relative intensities of the components being adjusted by variation in the composition of the target to give compensation for the matrix absorption effect.

One of the said secondary X-ray components may be produced by backscattering of primary X-rays from the radio-isotope source and in such a case the target includes a material which gives efficient backscattering of the primary X-rays, such as, for example, a material of low atomic number such as an epoxy resin. The other secondary X-ray components from the target will be produced as fluorescent X-rays excited from materials contained in the target such as, for example, nickel, caesium, silver, and selenium. The target may thus contain fluorescing material and a back-scattering material, for example, nickel in an epoxy resin, or a mixture of two or more fluorescing materials, such as, for example, nickel and caesium or nickel and silver, and with two fluorescing components, the ratio of the two components need not, in general, exceed 20 to 1 to provide the required compensation.

It may, in some circumstances, prove possible to use a target element of high atomic number and to excite the K X-rays thereof, whereby the L X-rays are excited in cascade with an efficiency and purity equal to those of the K X-rays, thus producing spectrally pure multiple X-ray energies.

A filter, for example of aluminium, would also be provided in most cases to give differential attenuation of the X-rays which pass from the sample to the measuring surface.

In order that the present invention may more readily be understood, several embodiments thereof will now be described by way of example, reference being made to the accompanying drawings, wherein, FIGURE 1 is a schematic illustration of an embodiment using a single scintillation counter;

FIGURE 6 shows two calibration curves;

FIGURE 7 shows two further calibration curves;

Figure 14:
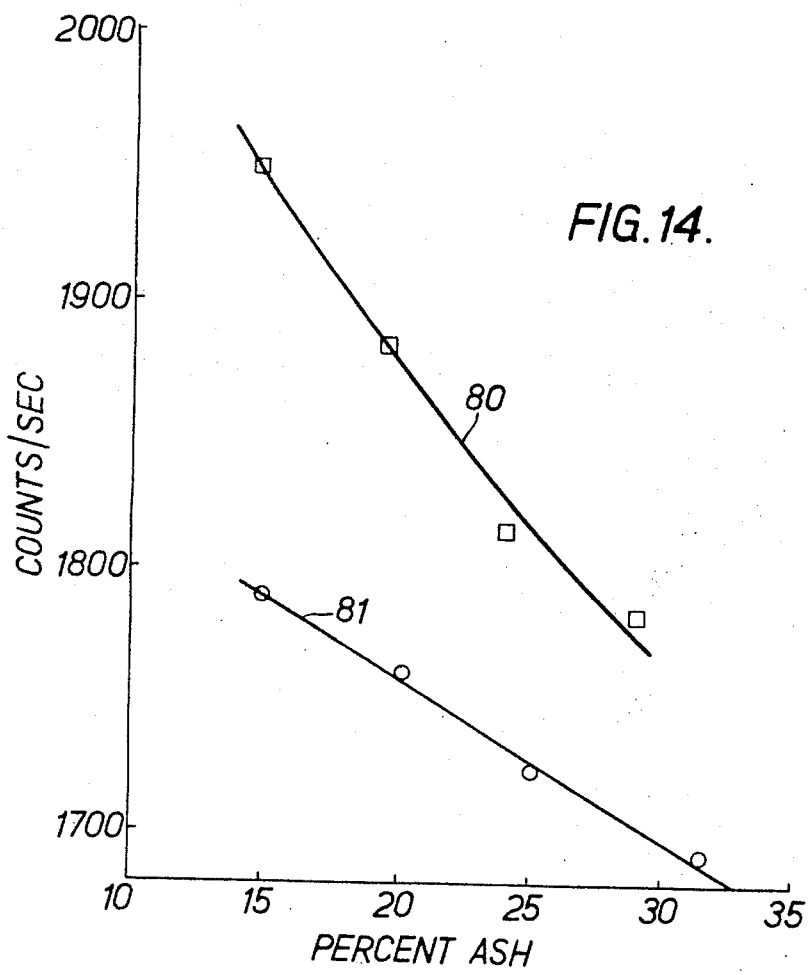
Figure 15:
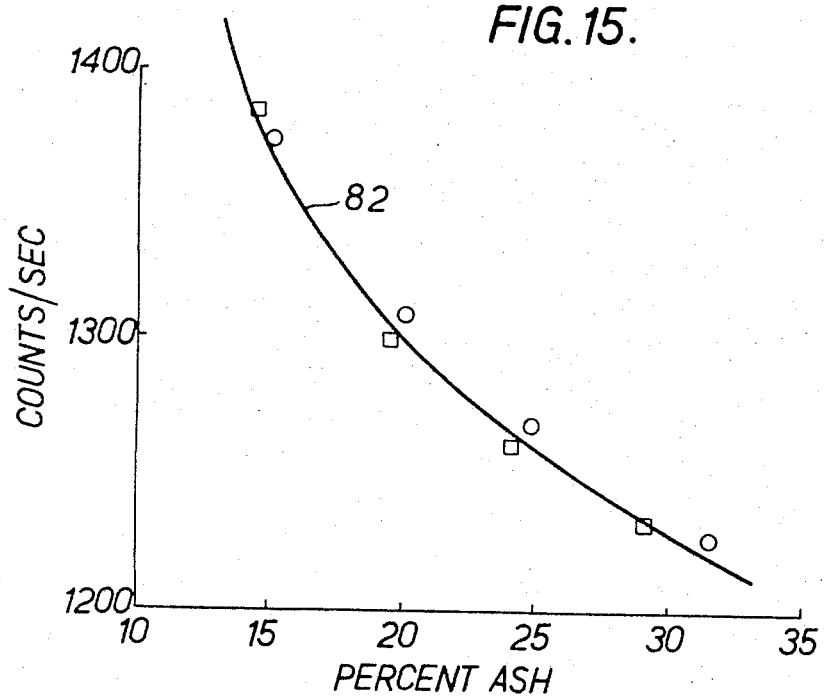
Figure 16:
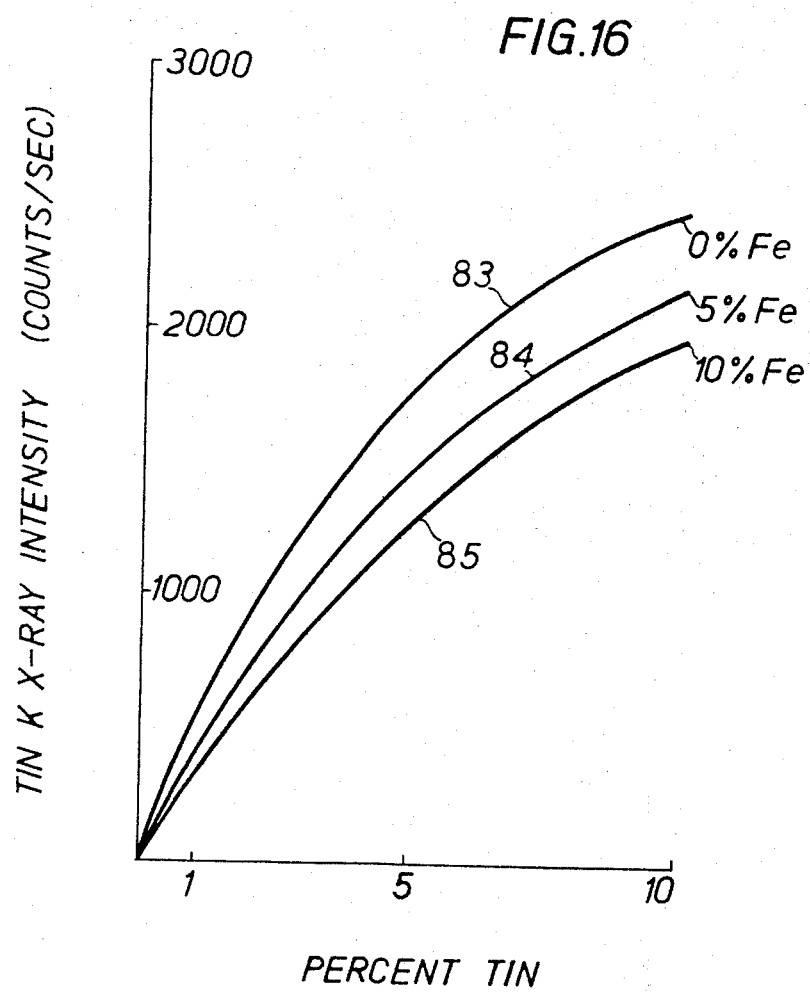
Figure 17:
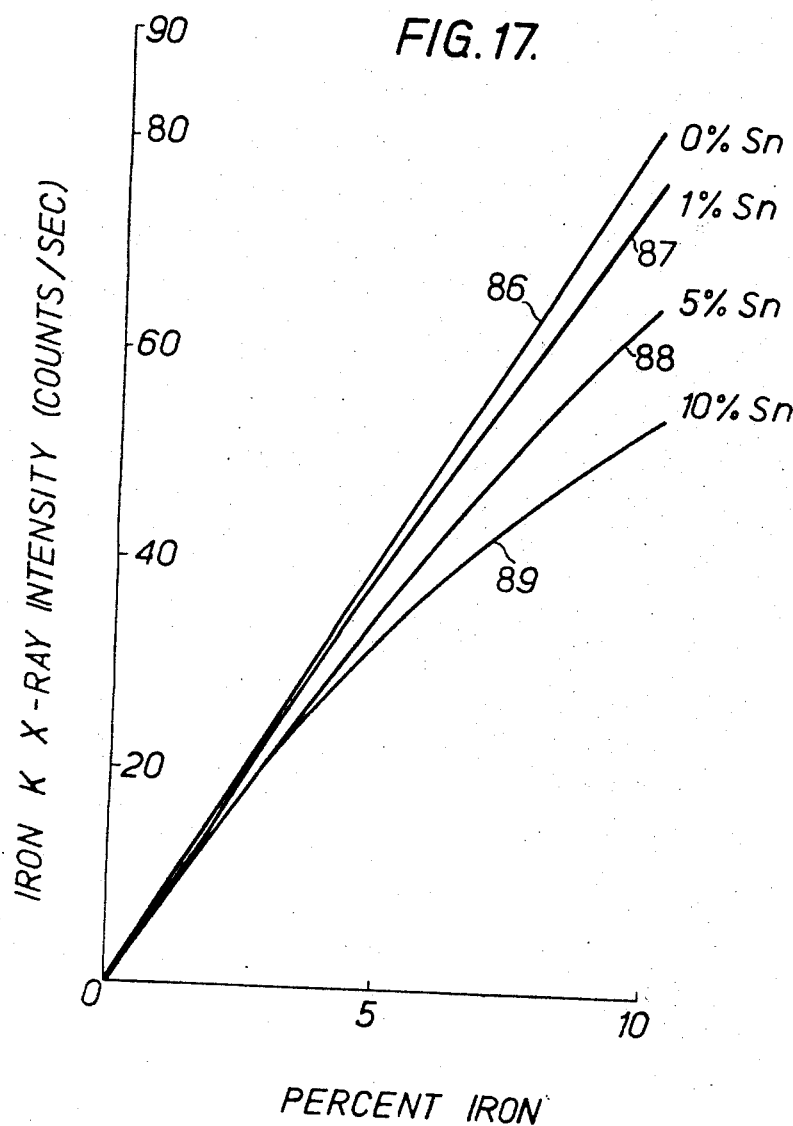
Figure 18:
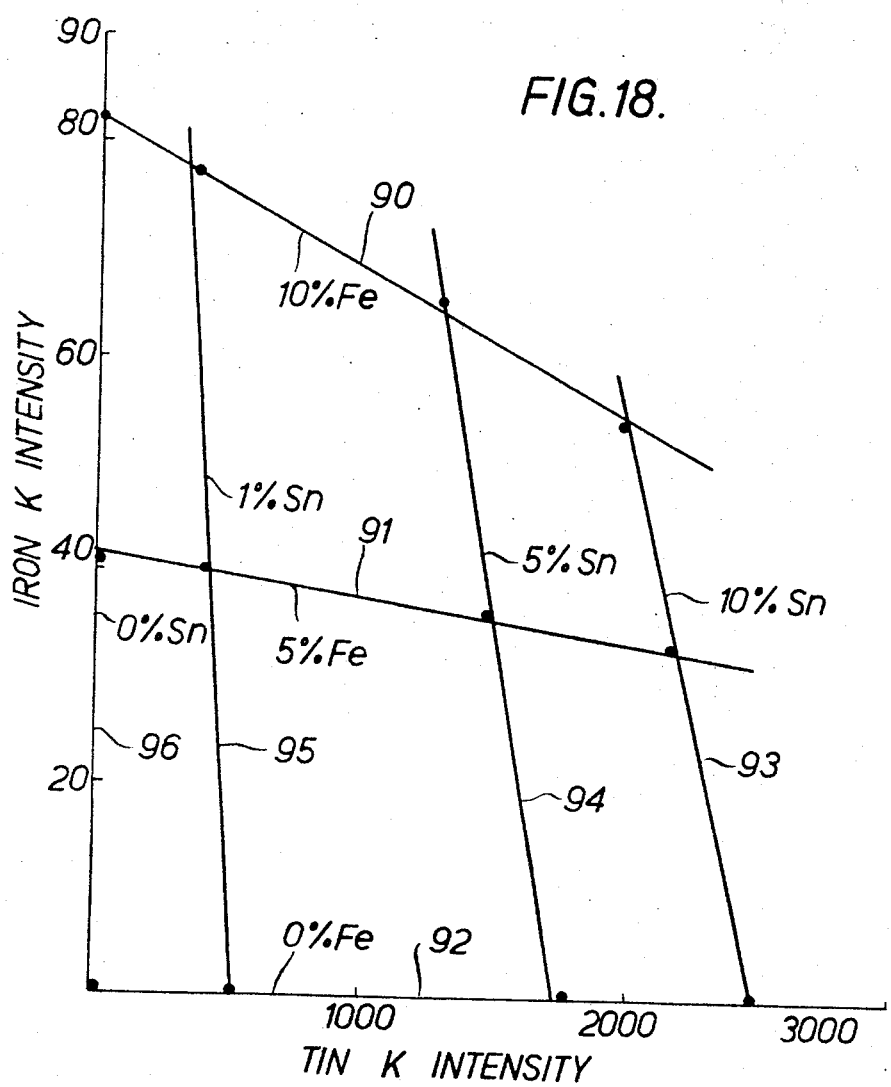
Figure 19:
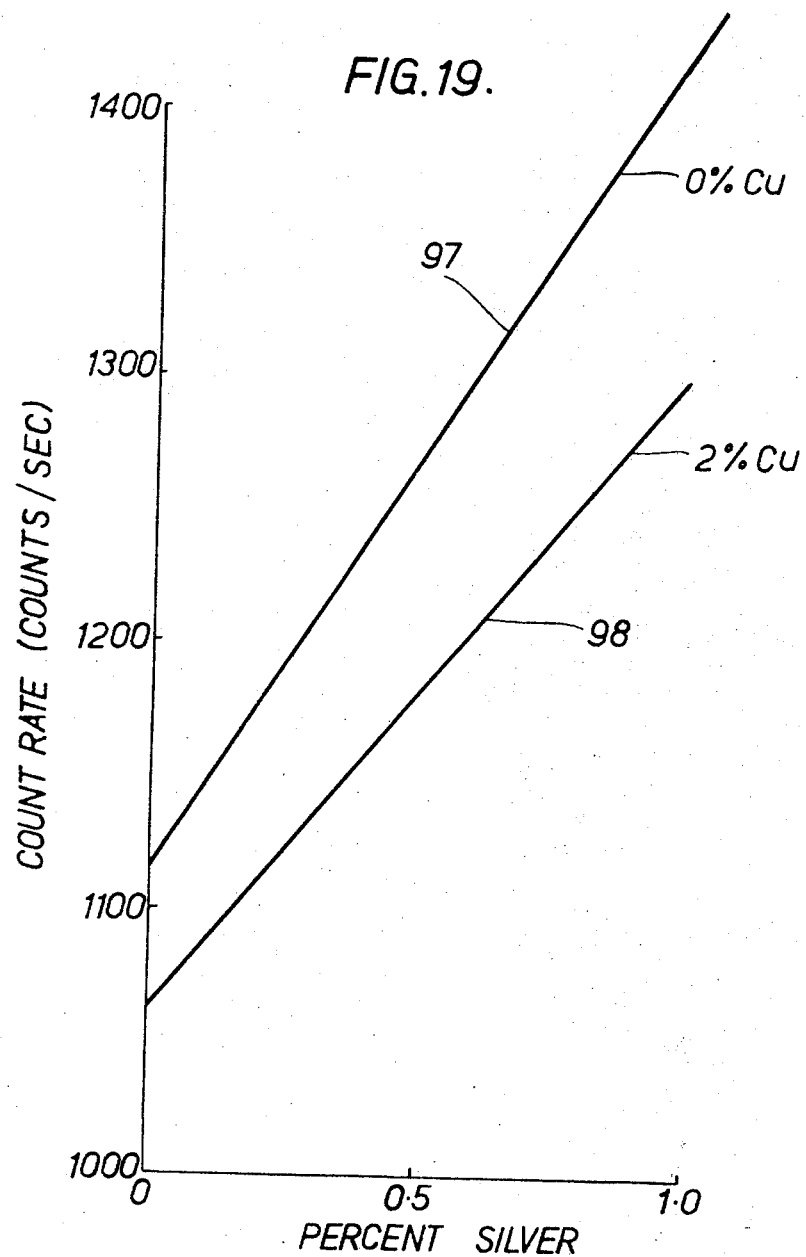
Figure 20:
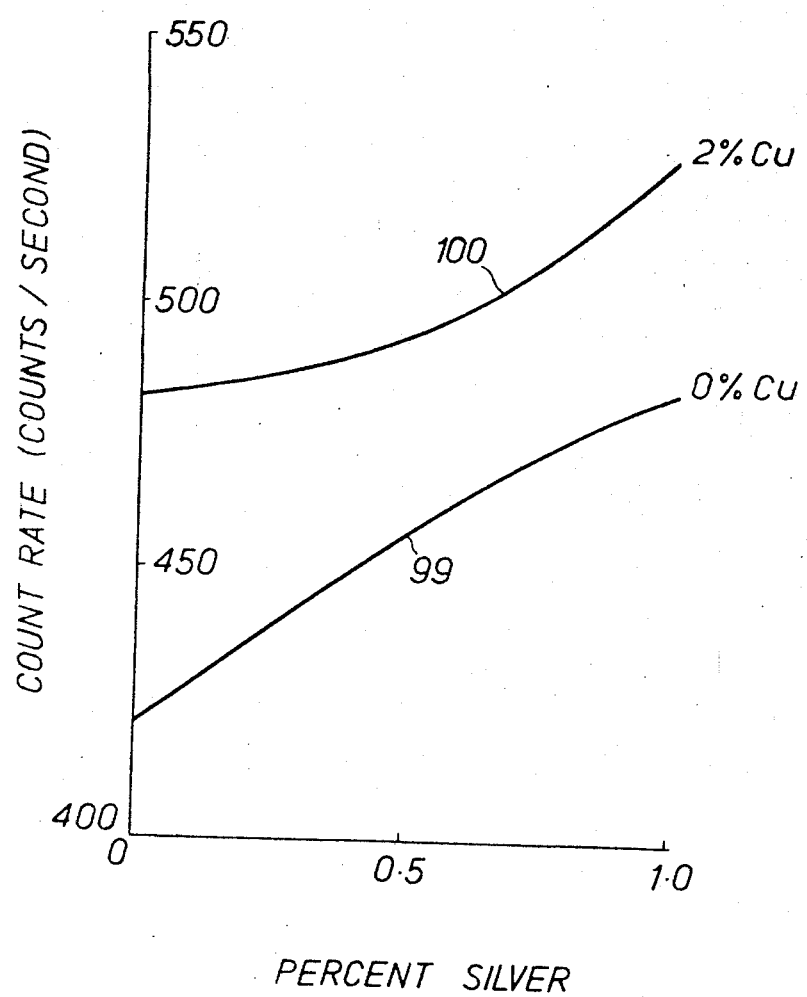
Figure 21:
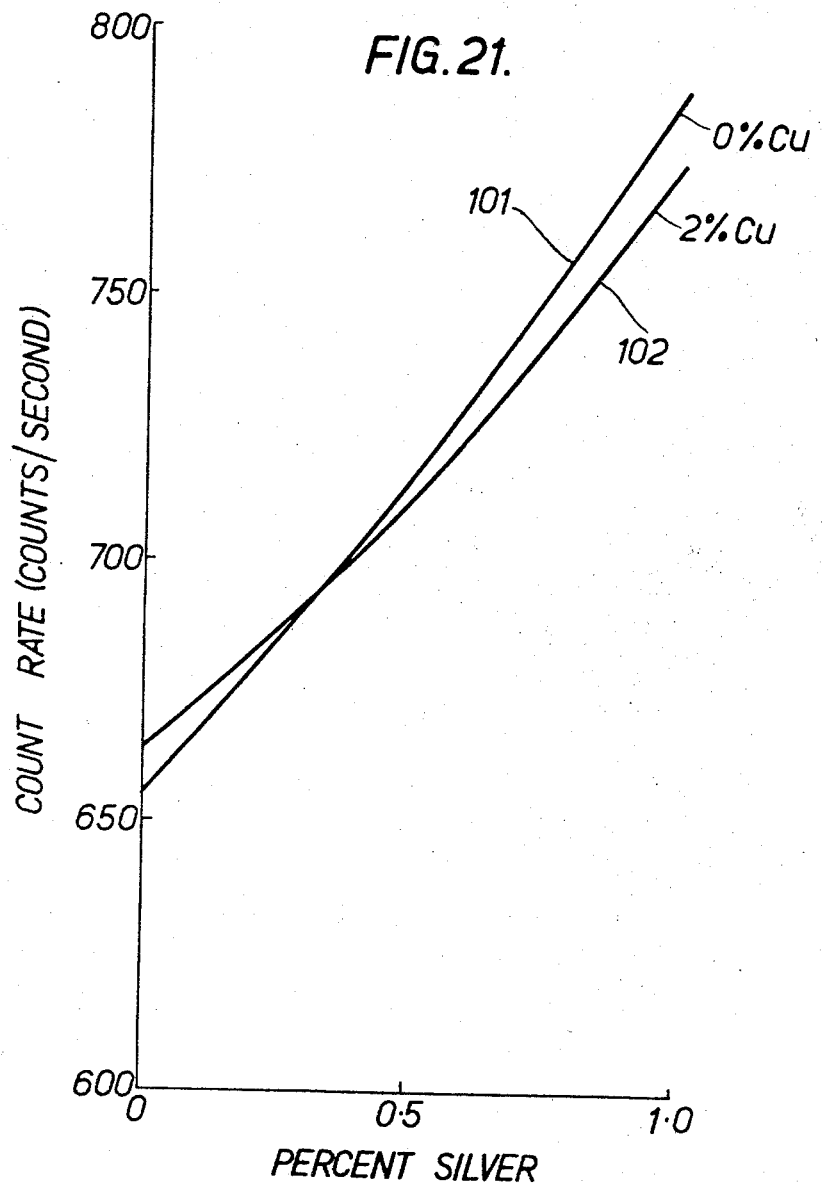
Figure 22:
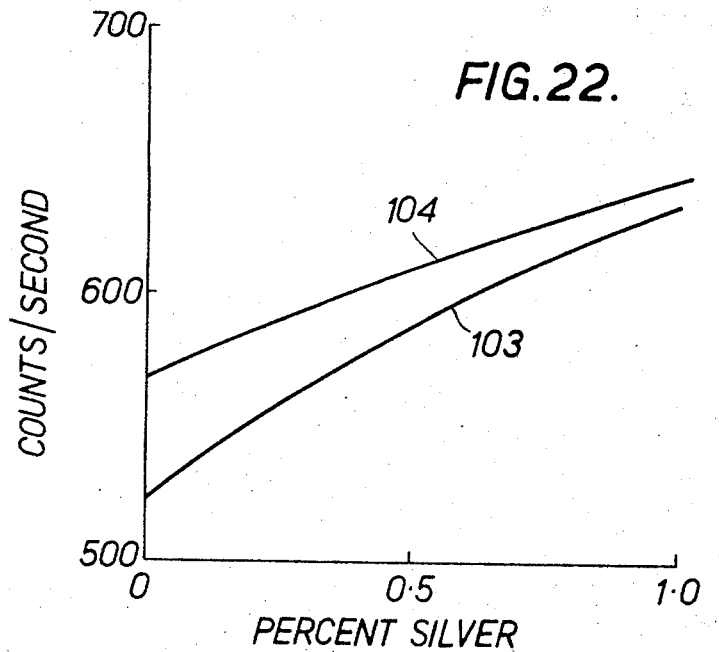
Figure 23:
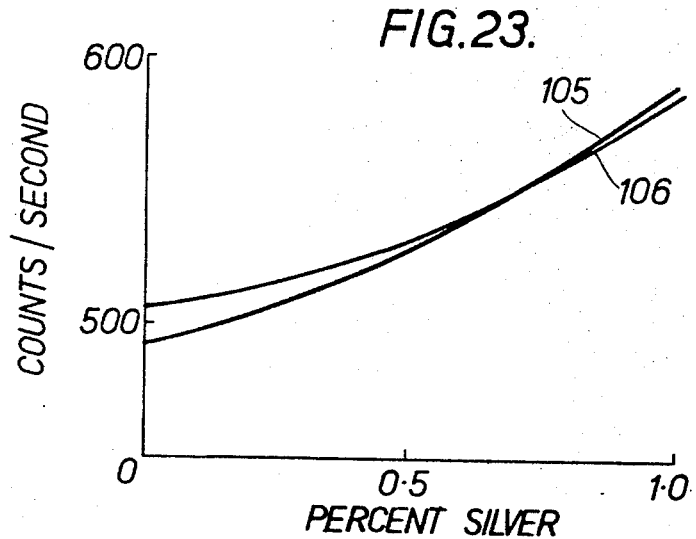
Figure 24:
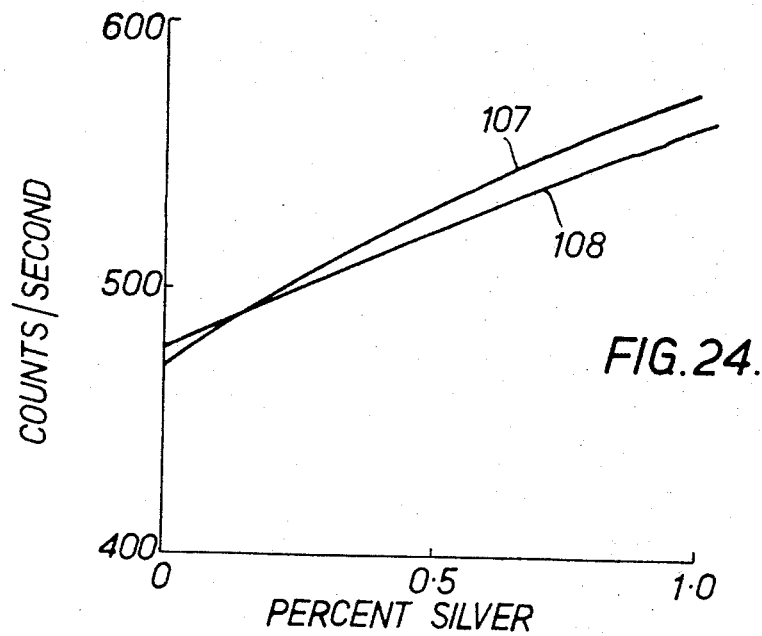

FIGURE 14 gives calibration curves for ash in coal determinations using a monochromatic source;

FIGURE 15 is similar to FIGURE 14 using the apparatus of the invention;

FIGURE 16 shows the effect of iron on tin X-ray fluorescent analysis;

FIGURE 17 shows the effect of tin on iron X-ray fluorescent analysis;

FIGURE 18 is a monogram constructed from FIGURES 17 and 18;

FIGURE 19 shows the effect of copper on sliver analysis with no compensation;

FIGURE 20 is similar to FIGURE 19 with overcompensation;

FIGURE 21 is similar to FIGURE 19 with almost exact compensation;

FIGURE 22 is similar to FIGURE 20 showing a different degree of overcompensation;

FIGURE 23 shows the effect of a filter;

FIGURE 24 shows the effect of a thicker filter; and

Figure 25:
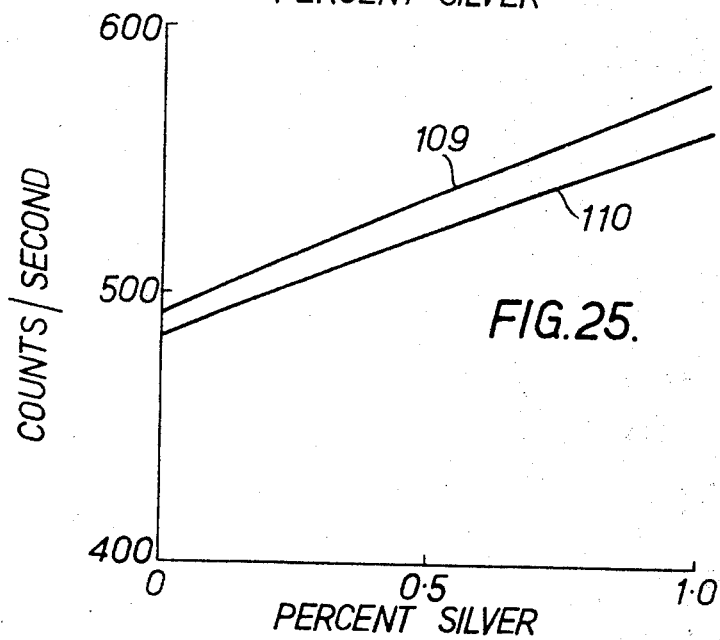

FIGURE 25 shows the effect of an even thicker filter.

Figure 1:
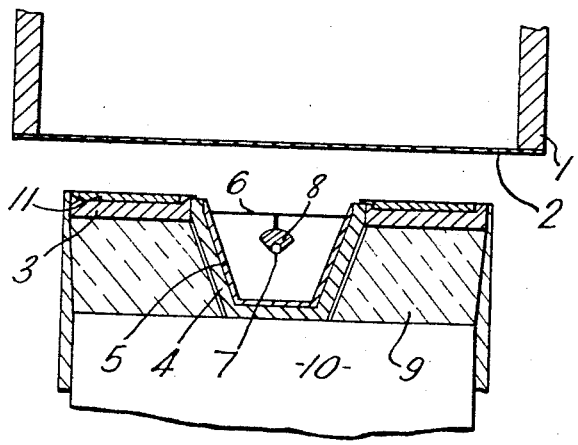

Referring now to the drawings and in particular to FIGURE 1, the invention will first be described with reference to the problem of analysing a sample of ore for the presence of tin using a fluorescent technique, conventional tin ores being used and containing tin in the proportions of 0–9% by weight.

Thus in FIGURE 1, a sample holder 1 is provided and has a thin window 2, for example of beryllium, at its lower end. This sample holder 1 is charged with the sample of ore to a depth sufficient for saturation excitation of the fluorescent tin radiation. Located below the sample holder 1 is an annular scintillator 3, for example a sodium iodide crystal activated by thallium, and the central bore of this crystal houses a frusto-conical target holder 4 made of a suitable shielding material, for example a tungsten alloy or gold, and of a sufficient thickness to act as a shield to prevent radiation passing therethrough. The inner surface of this target holder 4 is coated with a layer 5 of a suitable target element, in this case caesium in the form of a caesium compound. The layer 5 is formed by mixing caesium carbonate with a thermo-setting resin such as "Araldite," coating this mixture onto the internal surface of the holder and baking to set the resin. In order to protect the target, its surface was sprayed with lacquer to prevent the ingress of moisture. At about the mouth of the frusto-conical holder 4, a wire spider 6 locates and supports an isotope source 7 which is mounted in a gold holder 8 so shaped as to prevent direct primary radiation from the source reaching the sample holder 1. It will be understood that the source holder 8 and target holder 4 combine together to prevent direct primary radiation from the source 7 or secondary X-rays from the target 5 reaching the scintillator 3. A perspex light guide 9 having its upper end dimensioned to suit the diameter of the scintillator 3 and its lower end dimensioned to suit a photomultiplier 10 is provided with a tapered central recess in order to fit around the target holder 4 and acts to convey light from the scintillator 3 to the photomultiplier 10.

For reasons which will be apparent hereinafter, a filter is normally necessary and means are provided to hold a filter 11 in position above the scintillator 3.

Figure 2:
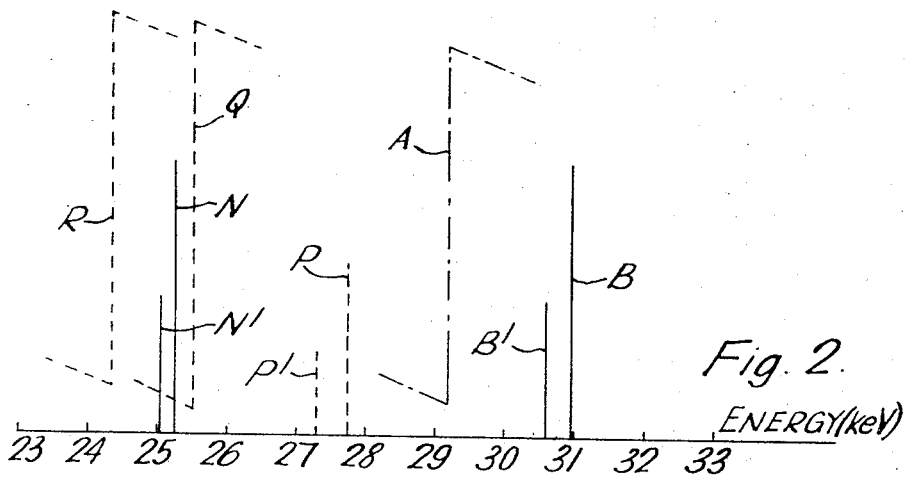
FIGURE 2 is a scale of energies.

As has been explained, it is desirable that the secondary X-rays from the target should have an energy which is above the K absorption edge of the element to be analysed in the sample and preferably only slightly above the K absorption edge. FIGURE 2 shows, on a suitable energy scale, the position of the K absorption edge of tin (curve A) at 29.2 kev. FIGURE 2 also shows (curves B and B′) the energies of caesium $K\alpha_1$ and $K\alpha_2$ radiation and it will be seen that these energies are high enough to stimulate fluorescent radiation in tin. However, it will be understood that the primary radiation from the source 7 will be scattered by the target 5 in addition to stimulating fluorescent X-rays in this target and we have found that, in some cases, it is desirable that the "purity ratio" in the secondary radiation from the target should be better than 10, "purity ratio" being defined as the ratio of the fluorescent component to scattered component of the secondary radiation.

Figure 3:
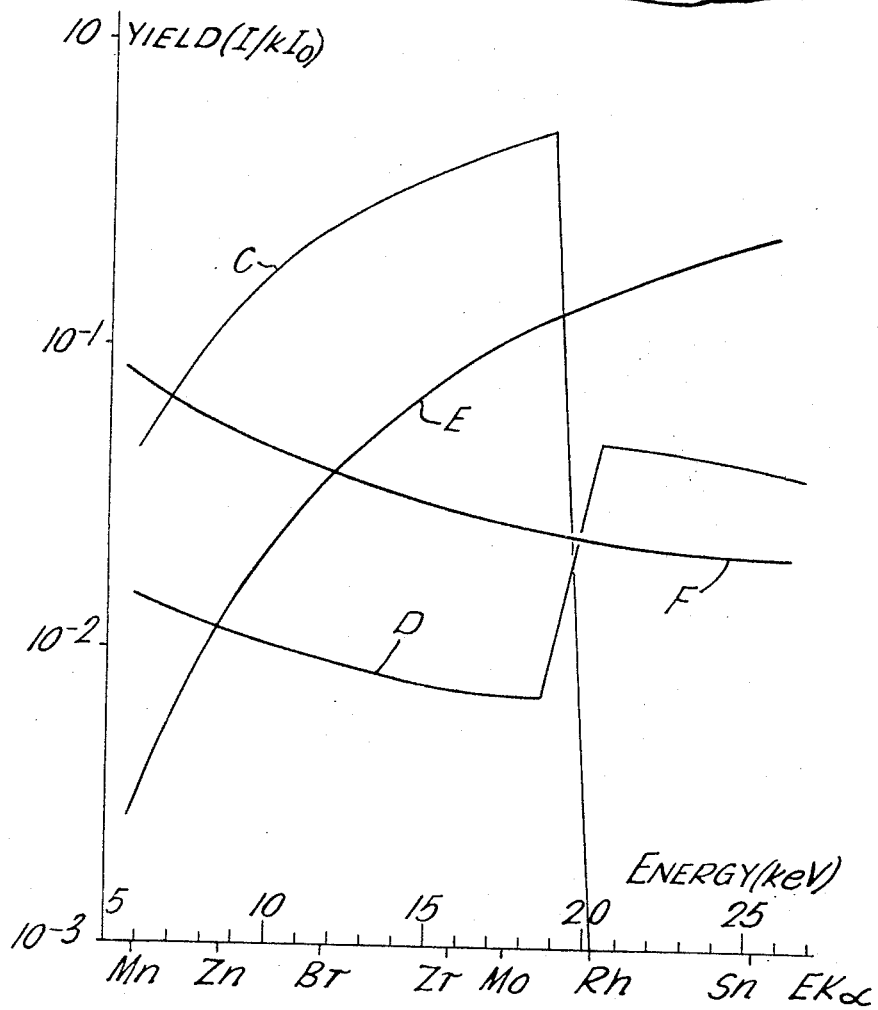
FIGURE 3 is a graph showing the efficiency of excitation of target/source combinations.

FIGURE 3 shows the fluorescent and scattered X-ray intensities of various target elements (and their characteristic energies) using the alternative isotope sources of cadmium-109 and americium-241. Curve C shows the yield of fluorescent X-rays using a cadmium-109 source and it will be seen that no fluorescent X-rays are generated above an energy of about 19.5 kev. whilst the scattered X-rays (shown in curve D) decrease up to this value and thereafter increase sharply. It will be apparent that cadmium-109 cannot be used as a source with target elements having $K\alpha$ energies above about 19.5 kev. Thus cadmium-109 may be used with targets ranging from iron ($K\alpha$ X-ray energy 6.41 kev.) to molybdenum (17.5 kev.). For the generation of X-rays above 20 kev. it is therefore necessary to use americium-241 as the source and the variation in fluorescent X-rays with this source is shown in curve E whilst the variation in the scattered X-rays is shown in curve F. In the present instance therefore, since caesium is being used as the target, it is apparent that the source should be americium-241.

It is to be noted, however, that the curves of FIGURE 3 relate only to the isotope sources cadmium-109 and americium-241 and other sources might be used, for example iron-55 or bremsstrahlung sources, provided that, when "pure" X-rays are required, a sufficient component of energy is available for producing secondary X-rays of suitable "purity" from the target material.

Figure 4:
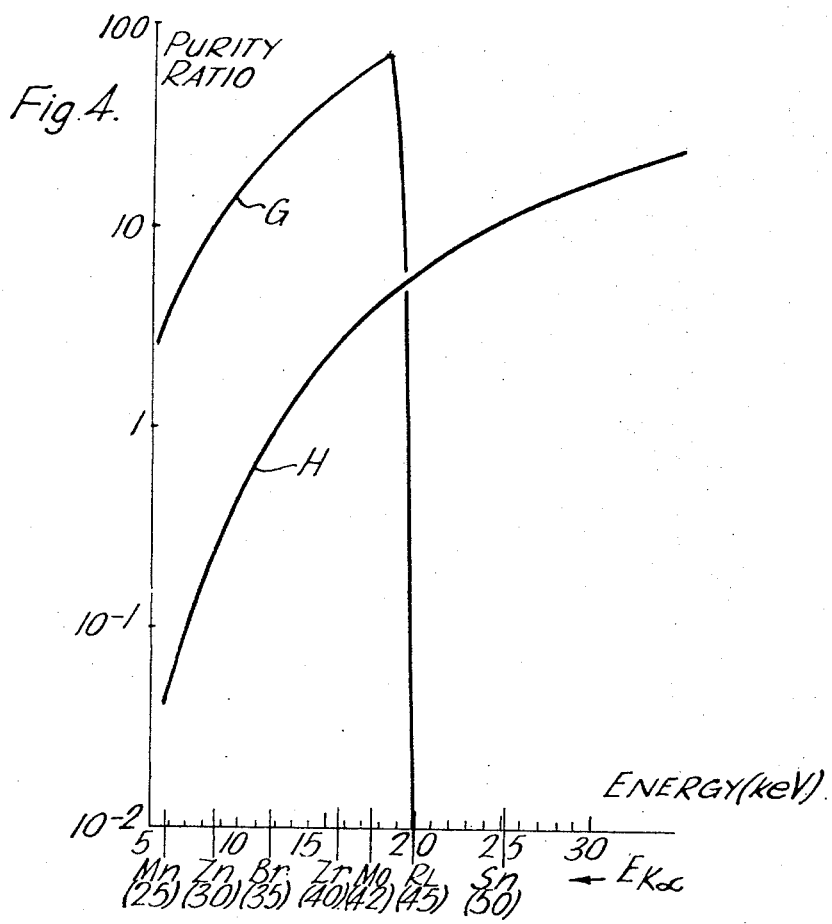
FIGURE 4 is a graph showing the proportions of the curves of FIGURE 3.

Using the information of FIGURE 3, the curves of FIGURE 4 may be obtained and it will be seen that the "purity ratios" for secondary X-rays resulting from the use of cadmium-109 sources are plotted in curve G, whilst those resulting from the use of americium-241 are plotted in curve H. Caesium has a $K\alpha$ energy of approximately 31 kev. and if an americium-241 source is used to excite the caesium fluorescence, it will be seen from FIGURE 4 that the "purity ratio" at this energy is greater than 10.

The present invention offers advantages in improved efficiency in excitation and improved efficiency in geometry and these two points will now be considered separately. In order to measure the excitation efficiency of the present invention, a conventional fluorescence experiment was set up using the known apparatus of FIGURE 5. This apparatus is known to be geometrically efficient.

Figure 5:
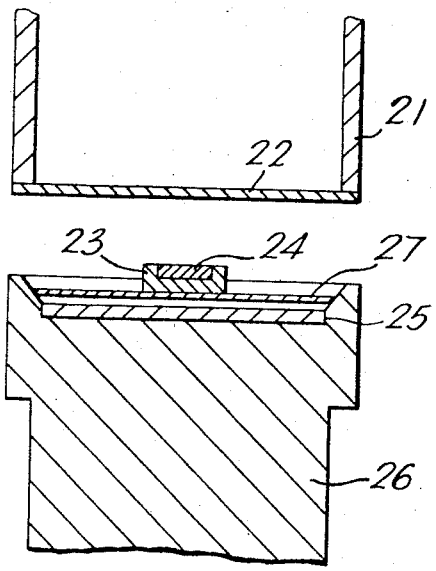
FIGURE 5 is a schematic illustartion of a known arrangement.

Referring now to FIGURE 5, a sample holder 21 is provided and has at its lower end a window 22. Located beneath this window is a source holder 23 in which is mounted an americium-241 source 24. The source holder 23 is supported above a scintillator 25 which is mounted on a photomultiplier 26 and provision is made for locating filters 27 between the sample and the scintillator 25. It will be seen that the shape of the source holder 23 is such that direct radiation from the source 24 cannot enter the scintillator 25.

Using the arrangements of FIGURE 1 and FIGURE 5, the curves shown in FIGURE 6 were obtained. Curve L shows the variation in count rate against tin content using the arrangement of FIGURE 1, whilst curve M shows the similar variation using the arrangement of FIGURE 5. No filters were used. It will be seen that in the arrangement of FIGURE 5 so much scattering of the radiation from the source took place that analysis of the tin content of the ore would be impossible but that with the arrangement of FIGURE 1 relatively little scattering took place and accurate measurement of the tin contained in the ore would be possible even at tin concentrations as low as 0.1% by weight.

Referring now to FIGURE 2 again it will be seen that the radiation excited in the tin is shown at curves N ($K\alpha_1$ radiation at 25.3 kev.) and N' ($K\alpha_2$ radiation at 25.1 kev.). The caesium radiation (curves B and B') is back-scattered by Compton scattering at an energy of between 27 and 28 kev. (curves P and P') and is also back-scattered by coherent scattering but without loss of energy. The K absorption edges of silver and palladium are shown at curves Q and R respectively and if, therefore, balanced filters of these two elements are used, the tin $K\alpha$ radiation will be selected at the expense of the scattered radiation.

It will be known that the technique of using balanced or "Ross" filters is to make a first measurement through one filter and a second measurement through the other filter and to subtract the counts obtained. Since the thickness of the filters is adjusted so that their absorptions outside the "pass band" of energies between their K absorption edges are equal, the net count rate obtained in this way corresponds only to energies in this "pass band."

The experiment of FIGURE 6 was therefore repeated to obtain the curves of FIGURE 7 using filters such as the filter 11 of FIGURE 1 and the filter 27 of FIGURE 5, these filters being made of silver and palladium. In FIGURE 7, curve S corresponds to the FIGURE 1 arrangement and curve T corresponds to the FIGURE 5 arrangement but the difference, as compared with FIGURE 6, is apparently less marked. However, if one calculates the relative error having in mind the individual counting rates for the arrangements, which in one experiment proved to be 2710 c./s. for the silver filter and 2510 c./s. for the palladium filter for curve S as compared with 2726 c./s. for the silver filter and 2706 c./s. for the palladium filter for curve T, it will be seen that the FIGURE 1 arrangement permits measurement of 0.1% by weight of tin with 3.6% relative error, whereas the FIGURE 5 arrangement has a relative error of 37%. Since the individual counting rates are approximately equal in both cases this indicates that the efficiency of excitation using the FIGURE 1 arrangement is greater by a factor of approximately 10 than the arrangement of FIGURE 5.

Figure 8:
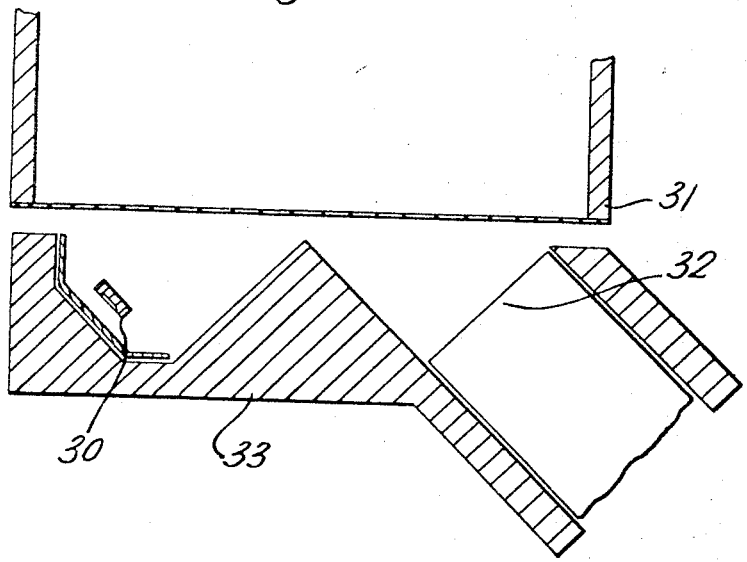
FIGURE 8 is a schematic illustration of a further arrangement.

It has however long been known that the efficiency of excitation of the FIGURE 5 arrangement is low and consequently the arrangement shown in FIGURE 8 has been proposed. In this case (see for example Martinelli U.S. Patent 3,056,027) a source is mounted at a position generally indicated at 30 and is arranged so that its radiation passes obliquely to a sample contained in a sample holder 31 and the fluorescent radiation from the sample is measured obliquely by a detector 32, the source and detector being shielded from one another by shielding 33. It should be pointed out that it has hitherto been proposed to use the geometrical arrangement of FIGURE 8 with the direct excitation of FIGURE 5, but in comparing the FIGURE 8 geometry with that of FIGURE 1 it was felt better to use the source and target combination of FIGURE 1 in this geometry in order to increase the efficiency of excitation. Thus FIGURE 8 does not represent a known prior arrangement but is an improvement on such known prior arrangements. Calculations show that the overall geometrical efficiency of FIGURE 1 is in the region 1–4% depending upon the precise dimensioning of the target and source. However, in the arrangement shown in FIGURE 8 the geometrical efficiency is only about $10^{-4}$ which is at least a factor of 100 worse than that of FIGURE 1. The maximum output of the primary source that may be used for analysis is limited by such considerations as specific activity, cost and safety and in FIGURE 1 the source had an activity of 5 mc. which gave counting rates for tin which were quite adequate for analysis. The maximum activity of americium-241 which could be incorporated in a source such as shown in FIGURE 8 is about 100 mc. and with such a source, analysis using the arrangement of FIGURE 8 is hardly practicable.

Having described one embodiment of the present invention in some detail and having also discussed the merits of the present apparatus, reference will now be made to FIGURES 9 and 12 which illustrate other embodiments of the invention, corresponding parts being identified by the same reference numerals as in FIGURE 1. In these figures the sample holder 1 is not shown but it will be fully appreciated that a sample holder of some form will be required when using any of these embodiments for the purpose of analysis.

Figure 9:
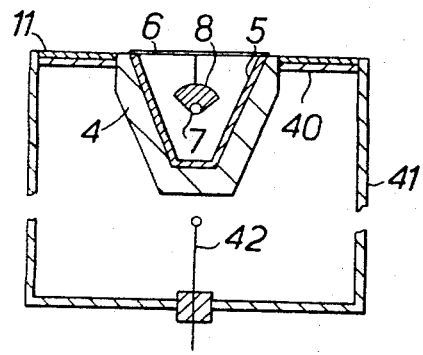
FIGURE 9 is an apparatus using a single gas-filled counter with an end window.

In FIGURE 9, the source-target combination is fitted into a central hole in an annular end window 40 of a gas-filled detector 41 having a centre collecting wire 42.

Figure 10:
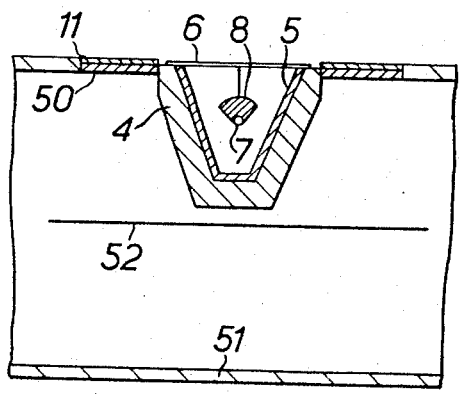
FIGURE 10 is an apparatus using a single gas-filled counter with a side window.

In FIGURE 10 the source-target combination is fitted into a central hole in an annular side window 50 of a gas-filled detector 51 having a centre collecting wire 52.

The apparatus of FIGURES 9 and 10 may be used in a similar manner to that of FIGURE 1.

Figure 11:
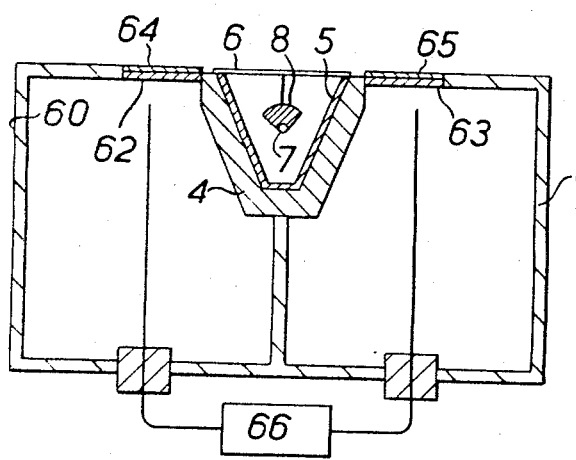
FIGURE 11 is an apparatus using two gas-filled counters.

The apparatus of FIGURE 11 comprises a source-target assembly having two detectors 60 and 61 associated with it. The detectors are of the gas filled type and have semi-annular windows 62 and 63 respectively forming an essentially complete annulus round the open end of the target holder 4. Each of the windows 62 and 63 is provided with a different one of a pair of semi-annular differential filters 64 and 65 respectively. The output from the two detectors is passed to an electronic subtraction circuit 66 and the output from the circuit 66 is directly related to the intensity of the radiation which is being isolated by the filters 64 and 65. If the apparatus was being used for the analysis of a tin ore, the filters 64 and 65 would be required to isolate the fluorescent tin X-rays, and would be of silver and palladium.

Figure 12:
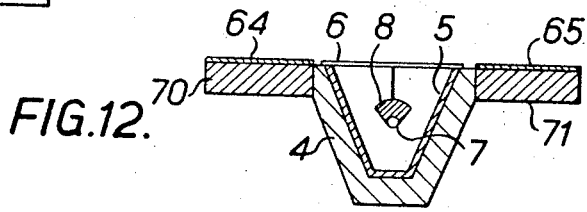
FIGURE 12 is an apparatus using two solid-state detectors.

The apparatus of FIGURE 12 is essentially the same as that of FIGURE 11 except that two solid state detectors 70 and 71 respectively are used in place of the gas-filled detectors. The output from the detectors 70 and 71 may be passed to an electronic subtraction circuit (not shown) to give an output dependent on the intensity of the wanted X-ray. The detectors may be lithium-drifted silicon.

Figure 13:
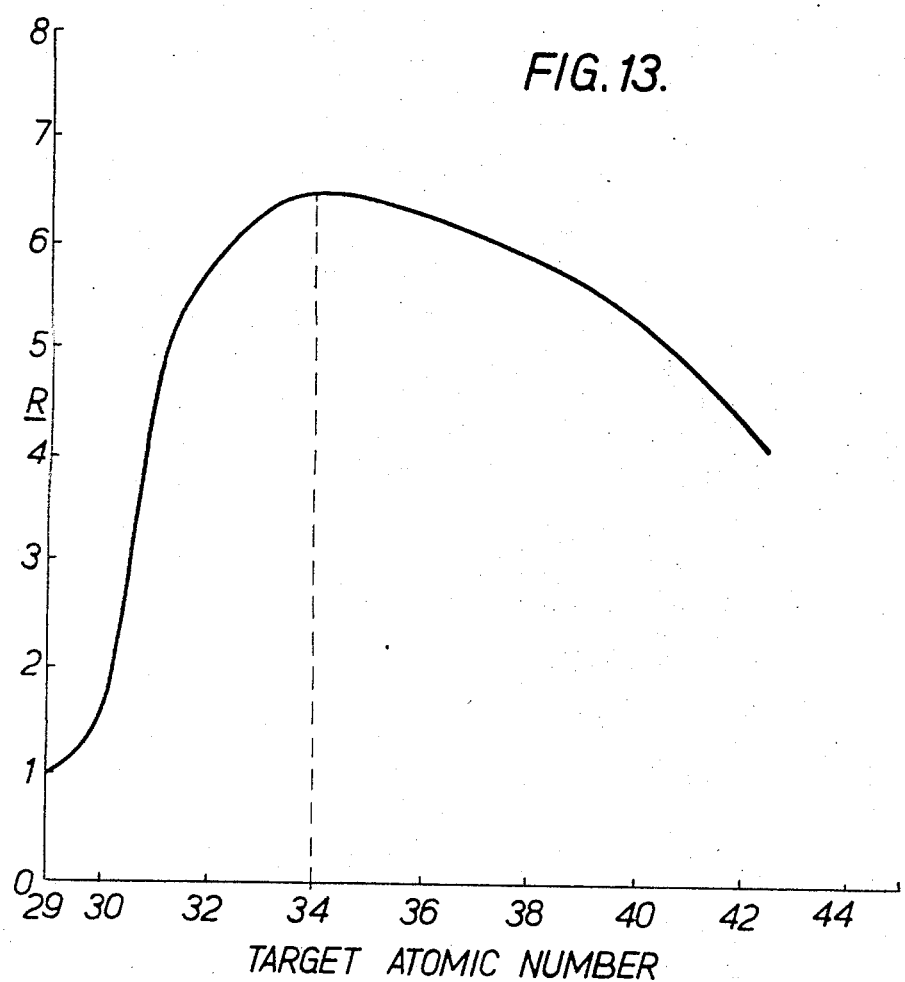
FIGURE 13 is an optimisation curve.

It should be appreciated that in fluorescent analysis, the maximum efficiency of the source-target combination is not necessarily obtained using a target which gives the most efficient excitation of the X-rays of the wanted element and this is illustrated in FIGURE 13.

The curve in FIGURE 13 was obtained using a cadmium-109 isotope source and target elements having atomic numbers within the range 29–45. For each target element, a ratio R was determined using in turn a copper sample and an aluminum sample, the ratio R being defined as:

$$R = \frac{\text{Count rate from copper sample}}{\text{Count rate from aluminum sample}}$$

It will be observed that R is a maximum with a target element having an atomic number of 34 (selenium) and not with the element which would be expected to excite the copper fluorescent X-rays most efficiently, namely gallium, which gives 9.3 kev. X-rays.

Although variations in the copper concentration may have some effect on the curve of FIGURE 13, it appears that in general when using a fluorescent technique for the analysis of copper containing minerals using the apparatus of the present invention, maximum efficiency may be obtained using a cadmium-109 source and a selenium target.

The invention has been described herein with particular reference to the use of a source-target combination to produce essentially mono-chromatic radiation. However, reference to FIGURES 2 and 3 will show that the secondary radiation always contains a back-scattered component accompanying the fluorescent radiation excited in the target. Thus, the radiation reaching the sample being analysed is composed of a mixture of fluorescent radiation from the target, for example caesium radiation at 31 kev. and back-scattered radiation from the source, for example with an americium-241 source, this would be about 50 kev. The component of backscattered radiation from the source can be increased by choosing a source/target combination which has a low purity ratio.

In general, using an essentially monochromatic source such as americium-241, the backscattered radiation is at an energy above that of the fluorescent X-rays from the target. However if a source is used which has an energy component too low to excite fluorescent X-rays in the target, there will be a low energy component in the back-scattered radiation. A similar effect may clearly be achieved by using a target comprising a mixture of elements chosen so as to be excited by the radiation from the source.

A source-target combination producing secondary X-ray components of two or more distinct energies is particularly suited for analysis using the method described in my said co-pending aplication Serial No. 485,708.

FIGURES 14 and 15 show the calibration curves obtained for ash in coal analysis by X-ray backscatter techniques. The results in FIGURE 14 were obtained using a known apparatus of the type shown in FIGURE 5 and the results in FIGURE 15 were obtained using apparatus similar to that shown in FIGURE 1.

Two samples of coal were analysed, and the results for one, a low iron coal (5–10% iron oxide in the ash), are represented by squares on the two figures, and the results for the other, a high iron coal (40–70% iron oxide in the ash), are represented by circles on the two figures.

The results in FIGURE 14 were obtained using a cadmium-109 radio-isotope source, and it will be seen that two distinct curves may be drawn, curve 80 for the low iron coal and curve 81 for the high iron coal. Thus, no compensation was obtained with this arrangement.

The results in FIGURE 15 may all be fitted onto a single curve, curve 82, and this indicates that compensation for the interfering effect of the iron has been obtained. The source of primary X-rays was a cadmium-109 source (source strength about 3 mc.) and the target was a mixture of 65% by weight of selenium powder and 35% by weight of an epoxy resin. This combination produces a mixture of 11.2 kev. selenium K X-rays and 20–22 kev. X-rays resulting from back-scattering of the primary 22 kev. X-rays from the cadmium-109 source.

The high energy component is back-scattered by the sample whilst the low energy component excites the 6.4 kev. iron K X-rays. The radiation passing from the sample in a back-scattered direction consists of back-scattered 20–22 kev. X-rays, backscattered 11.2 kev. X-rays, and the 6.4 iron K X-rays. The total intensity of this radiation is then measured by the detector. It was not necessary to use a filter with the detector since the required compensation was obtained by the source-target arrangement.

Using the apparatus of the present invention to give two X-ray components, it is possible to analyse a sample for two components.

The results in FIGURES 16, 17 and 18 were obtained using an americium-241 radio isotope source (source strength about 2.5 mc.) of primary X-rays and a target comprising 50% by weight of an epoxy resin, 45% by weight of selenium powder and 5% by weight of caesium carbonate. The samples studied were tin ores containing various amounts of tin and iron, it being desired to determine the concentrations of both of these elements.

The tin content was measured using silver and palladium balanced filters to isolate the 25 kev. tin K X-rays which are excited by the 31 kev. caesium K X-ray component of the X-rays incident on the sample. The results obtained are shown in FIGURE 16. Curve 83 shows the results obtained when the sample contains no iron and curves 84 and 85 show the results obtained in the presence of 5 and 10 percent by weight of iron, respectively. It will be seen that iron is interfering and thus the tin content cannot be determined with any accuracy.

The iron content was measured using chromium and manganese balanced filters to isolate the 6.4 kev. iron K X-rays which are excited by the 11.2 kev. selenium K X-ray component of the X-rays incident on the sample. The results obtained are shown in FIGURE 17 in which curve 86 was obtained in the absence of tin, and curves 87, 88 and 89 were obtained in the presence of 1, 5 and 10 percent by weight of tin respectively. In this case the tin interferes and the iron content cannot be determined accurately.

To enable accurate analysis to be made from the results of FIGURES 16 and 17, the nomogram of FIGURE 18 may be drawn from the results used in obtaining the curves of FIGURES 16 and 17. Curve 90 shows the variation in the iron intensity from a sample containing 10% of iron and from 0 to 10% of tin. Curves 91 and 92 are similar to curve 90 for iron contents of 5 and 0% respectively. The effect of iron on the tin intensity is shown by curves 93, 94, 95 and 96 for samples containing 10, 5, 1 and 0 percent of tin respectively and varying iron contents. Using this nomogram, the iron and tin contents may both be determined, once the tin and iron intensities have been measured, with considerably more accuracy than is possible from FIGURES 16 and 17. Thus, the nomogram provides compensation for the interference effects which occur when attempting to determine the iron and tin contents of materials which contain both of these elements.

From FIGURES 16 and 17 it will be observed that the count rate for the tin fluorescence is much greater than that for the iron fluorescence and thus it is not possible to use this arrangement to obtain compensation by measuring the total intensity of all the X-rays passing from the sample in a back-scattered direction. However, if a detector were used which had a greater sensitivity for the low energy iron K X-rays than for the higher energy tin K X-rays, compensation for the interelement effect might then be obtained.

Compensation using a mixed target for X-ray fluorescent analysis is however possible, as will be explained by reference to FIGURES 19, 20 and 21. The sample to be analysed was a silver ore in which copper was present as the interfering element. The apparatus of FIGURE 1 was used, the source being a 2.5 mc. americium-241 source. The target consisted of various amounts of tin and selenium to give a total of five grammes of metal in admixture with 2.2 grammes of epoxy resin. The detector was a scintillation counter with a top level discriminator to eliminate large pulses from the detection of radiation of energies in excess of 40 kev. and a bottom level discriminator to eliminate the noise and small pulses from radiation of energies less than 4 kev.

The results in FIGURE 19 were obtained with a target of five grammes of tin powder in 2.2 grammes of epoxy resin. Curve 97 was obtained in the absence of copper and curve 98 in the presence of 2% by weight of copper. It will be observed that the effect of the copper is not adequately compensated, this being due to the inefficient excitation of the copper X-rays by the 2.5 kev. tin X-rays from the target.

In FIGURE 20, overcompensation resulted from the use of a target comprising 4 grammes of selenium powder, one gramme of tin powder and 2.2 grammes of epoxy resin. Curve 99 summarises the results in the absence of copper and is below curve 100 which summarises the results in the presence of 2% of copper. This indicates that considerable copper fluorescence is now being excited, primarily by the 11.2 kev selenium K X-rays, and this is resulting in overcompensation of the copper interference.

FIGURE 21 shows almost exact compensation, curve 101 for the results in the absence of copper and curve 102 for the results in the presence of copper, being nearly coincident. The target in this case contained equal proportions by weight of selenium and tin and had a composition of 2.5 grammes of selenium, 2.5 grammes of tin and 2.2 grammes of epoxy resin.

FIGURE 22 is for a similar series of samples, that is silver ore containing copper, using a target of composition; three grammes of selenium powder, two grammes of tin powder and 2.2 grammes of epoxy resin. Curve 103 was obtained in the absence of copper and curve 104 in the presence of 2% of copper and it will be seen that overcompensation is obtained.

In obtaining the curves of FIGURE 23 a similar arrangement to that described in relation the FIGURE 22 was used with a 0.0004 inch thick aluminium filter. Curve 105 in the absence of copper and curve 106 in the presence of 2% copper are almost coincident showing that the aluminium filter is correcting for the overcompensation.

FIGURES 24 and 25 were obtained with 0.001 inch thick and 0.006 inch thick aluminium filters respectively and it can be seen that the final effect of the aluminium filter is to change the overcompensation of FIGURE 22 into undercompensation. Curves 107 and 109 were obtained in the absence of copper and curves 108 and 110 in the presence of 2% of copper.

It will be seen from the foregoing that the present invention offers a versatile apparatus for X-ray analysis using back-scattering geometry and that this apparatus has a higher geometrical efficiency and a higher efficiency of excitation that the apparatus previously proposed.

I claim:

1. Apparatus for X-ray analysis using backscatter geometry comprising a radioisotope source of primary X-rays; a holder for such source; a generally concave target for producing secondary X-rays, the said source of primary X-rays being positioned by said holder to direct the primary X-rays toward said target and the composition of the target being selected to give secondary X-rays having two distinct energy components; a radiation measuring means having an external radiation measuring surface, such radiation measuring surface extending at least partially around the perimeter of the target; means to accommodate a shaped filter adjacent to said external radiation measuring surface; and means to prevent primary and secondary radiation from directly entering the radiation measuring means.

2. The apparatus of claim 1 including two radiation detecting means and two radiation measuring surfaces around the target, each of said measuring surfaces being provided with a filter, such filters forming a pair of differential filters wherein one of said filters is essentially opaque to radiation of a given energy band and the other of said filters is essentially transparent to said radiation, the absorption characteristics of the filters outside said energy band being essentially the same.

3. The apparatus of claim 2 wherein one of said pair of differential filters is silver and the other is of palladium.

4. The apparatus of claim 1 wherein the radiation measuring means is a scintillation counter comprising a scintillator at least partially surrounding the target, a photomultiplier located generally below the base of the target and a light guide located between the scintillator and the photomultiplier to convey light from the scintillator to the photomultiplier.

5. The apparatus of claim 1 for the determination of tin and iron in a sample wherein the radio isotope source is americium-241 and the target consists of a mixture of selenium and caesium in an epoxy resin.

6. The apparatus of claim 5 wherein the target has a composition, by weight, of 50% epoxy resin, 45% selenium powder and 5% caesium carbonate.

7. The apparatus of claim 1 wherein the composition of the target is selected to give an analytical secondary X-ray component of an energy suitable for the determination of a wanted element in a sample and at least one compensating secondary X-ray component of an energy suitable to excite fluorescence in an interfering element present in the sample, and the amounts of materials of which the target is composed are selected to control the relative intensities of the secondary X-ray components to give compensation for the matrix absorption effect.

8. The apparatus of claim 7 including a filter to provide differential attenuation of the X-ray components passing from the sample to the radiation measuring surface.

9. The apparatus of claim 8 wherein the filter is formed of aluminium.

10. The apparatus of claim 7 for the X-ray back scattering analysis of coal wherein the radio isotope source is cadmium-109 and the target is selenium in an epoxy resin.

11. The apparatus of claim 10 wherein the target has a composition by weight of 65% selenium and 35% epoxy resin.

12. The apparatus of claim 7 when used for the X-ray fluorescent analysis of silver wherein the source is americium-241 and the target a mixture of selenium, tin and epoxy resin.

13. The apparatus of claim 12 wherein the target has a composition, in parts by weight, of 2.5 parts of selenium, 2.5 parts of tin and 2.2 parts of epoxy resin.

References Cited

UNITED STATES PATENTS

| | | |
|---|---|---|
| 2,858,450 | 10/1958 | Holben. |
| 3,012,140 | 12/1961 | Pellissier et al. _____ 250—51.5 |
| 3,210,541 | 10/1965 | Cropper et al. _____ 250—43.5 |
| 3,256,431 | 6/1966 | Fraser _____ 250—43.5 |

RALPH G. NILSON, *Primary Examiner.*

A. L. BIRCH, *Assistant Examiner.*

U.S. Cl. X.R.

250—83.3, 106